United States Patent [19]

Sano

[11] Patent Number: 4,810,293

[45] Date of Patent: Mar. 7, 1989

[54] ANTI-CORROSIVE PAINT COMPOSITION

[75] Inventor: Shunichi Sano, Takarazuka

[73] Assignee: Nippon Oil and Fats Co., Ltd., Tokyo, Japan

[21] Appl. No.: 52,110

[22] Filed: May 19, 1987

[30] Foreign Application Priority Data

May 20, 1986 [JP] Japan ................................ 61-115408

[51] Int. Cl.$^4$ ........................... C04B 9/02; C09K 3/00
[52] U.S. Cl. ................................ 106/14.21; 106/1.17; 106/287.16; 106/287.19
[58] Field of Search .................. 106/287.16, 14.21, 84, 106/1.17, 287.19

[56] References Cited

U.S. PATENT DOCUMENTS

| | | | |
|---|---|---|---|
| 3,910,797 | 10/1975 | Beers | 106/287.16 |
| 4,219,358 | 8/1980 | Hayashi | 106/14.21 |
| 4,254,009 | 3/1981 | Dittrich | 106/1.17 |

*Primary Examiner*—Theodore Morris
*Attorney, Agent, or Firm*—Flynn, Thiel, Boutell & Tanis

[57] ABSTRACT

An anti-corrosive paint composition, which contains a hydrolyzed condensate of tetraalkoxy silicate having an alkyl group where carbon number is 1 to 5 as vehicle, thereby adding zinc dust and titanium oxide which extensively improves the heat resistance while holding basic conditions required for the primary anti-corrosive paint for steel, i.e., exposure anti-corrosive property, compatibility to top coat, welding and gas cutting properties and adhesion to steel plate.

5 Claims, No Drawings

4,810,293

ANTI-CORROSIVE PAINT COMPOSITION

BACKGROUND OF THE INVENTION

This invention relates to an anti-corrosive paint composition and, more particularly, to an anti-corrosive paint composition, which is effective as a primary anti-corrosive paint for large-size steel structures and has excellent heat resistance, good exposure, an anti-corrosive property, welding property, gas cutting property and compatibility to the top coat.

DESCRIPTION OF THE PRIOR ART

To build large size steel structures, such as ships, off-shore structures and on-shore structures, primary surface treatment is done by shot blasting or sand blasting, and then a primary anti-corrosive paint is coated, e.g., wash primer, zinc-rich epoxy primer or inorganic zinc-rich primer.

Although these anti-corrosive paints have different anti-corrosive intervals, they provide a given anti-corrosive effect for the major portions (mainly flat portions) of the steel structure.

With recent size increases of steel structures, however, welded portions and removal of deformations due to welding have increased, giving problems on corrosion for damages effected by heat.

To solve this problem, it is necessary to carry out a secondary rust removal of heat damaged areas by sand blasting, power tools or hand tools.

To this end, a great deal of manual labor is necessary.

In the prior art, inorganic zinc-rich primers consisted of an inorganic vehicle and a high concentration of zinc dust.

Therefore, degradation due to heat damage was limited to a minimum, and corrosion of the heat damaged portion did not give any substantial problem.

However, zinc fumes produced at the time of welding and gas cutting, led to sanitation problems, poor adhesion of oil-based paints, etc.

For these reasons, it was inevitable to reduce the zinc dust concentration, and recently modified inorganic zinc-rich primers have been adopted mostly in ship yards.

It was intended to replace a part of ethyl silicate, which is a vehicle of the inorganic zinc-rich primer, with polyvinyl butyral resin, which is an organic polymer, and also to reduce the zinc dust concentration, thereby to avoid the draw-backs of the above-mentioned inorganic zinc-rich primer.

However, since the polymer in the inorganic primer composition decomposed, the heat resistance of modified inorganic zinc-rich primer was reduced, and the anti-corrosive property where affected by heat was extremaly reduced.

The prior art primary anti-corrosive paints for steel have been effectively utilized to make use of their respective features, but the corrosion of the portion under heat influence still remains as an unsolved problem.

Particularly, in the circumstances where "rust prevention tactics" are practiced in various forms mainly in shipbuilding yards, how to make a great stride on the heat resistance of the primary anti-corrosive paint for steel can be said to be the controversial point of the problem.

SUMMARY OF THE INVENTION

An object of the invention is to provide an anti-corrosive paint composition, which imparts an extreme heat resistance to the modified inorganic zinc-rich primers, which are presently used, so that the anti-corrosive property of the back surface of welding and removal of deformation can be extremely improved to permit reduction of secondary rust removal.

Another object of the invention is to provide an anti-corrosive paint composition, which shows satisfactory adhesion even in a humid environment.

A further object of the invention is to provide an anti-corrosive paint composition, which has an excellent welding property and gas cutting property compared to the modified inorganic zinc-rich primers.

The invention is based on the findings that in an anti-corrosive paint composition containing a hydrolyzed condensate of tetraalkoxy silicate in which the alkyl groups have a carbon number of from 1 to 5, as well as zinc dust, titanium oxide reacts with and is firmly coupled to the tetraalkoxy silicate hydrolyzed condensate and that the above objects are met by an anti-corrosive paint composition in which the volume concentration of pigment is 40 to 60%, and which contains 40 to 60% by volume of the tetraalkoxy silicate hydrolyzed condensate as vehicle, 5 to 25% by volume of zinc dust in the dry film and 10 to 30% by volume of titanium oxide.

[Composition]

A gist of the invention resides in an anti-corrosive paint composition, which contains a vehicle, zinc dust and titanium oxide, the vehicle being a hydrolyzed condensate of tetraalkoxy silicate in which the an alkyl group has a carbon number of from 1 to 5.

The tetraalkoxy silicate employed according to the invention has an alkyl group whose carbon number is 1 to 5, and examples of such silicate are tetramethoxy silicate, tetrapropoxy silicate, tetrapropyoxy silicate, tetraisopropoxy silicate and tetrabutoxy silicate.

An alkyl group having a carbon number of over 6 is undesired because the hardening property is extremely reduced.

Tetraalkoxy silicate is incapable of building a film, so that it is condensed by hydrolysis to form a vehicle by using, as a catalyst, an inorganic acid such as hydrochloric acid, nitric acid and sulfuric acid or a mixture of such inorganic acid with formic acid, acetic acid, etc.

Zinc dust employed according to the invention is spherical or flake-like in shape, and it is formulated by 5 to 25% by volume, preferably 8 to 20% by volume, in the dry film.

When its amount is less than 5% by volume, the cohesion and anti-corrosive property of the paint are reduced.

When its amount is in excess of 25% by volume, the compatibility with an oil-based overcoating paint is deteriorated.

Titanium oxide employed according to the invention is of rutile or amatase type or a mixture of these two types. Its amount is 10 to 30% by volume, preferably 15 to 25% by volume, in the dry film.

When the amount is less than 10% by volume, the heat resistance is reduced, and also the wear-proof property is reduced due to insufficient cohesion.

When the amount is in excess of 30% by volume, the dry film is too hard, and the impact resistance is reduced.

As has been shown, according to the invention, a hydrolyzed condensate of tetraalkoxy silicate is formulated as a vehicle and zinc dust and titanium oxide are employed as essential pigments.

The insolubilizing action necessary for the building of the film has heretofore been provided as a cross-linking reaction between the silicon and zinc dust.

According to the invention, titanium oxide is added to these two components, and a tertiary system, consisting of silicate, zinc dust and titanium oxide, constitutes a film-building system.

In addition to this tertiary film building system it is also possible to use pigments generally used for the paint, e.g., silica powder, talc, mica, iron oxide, chromium oxide, iron phosphate and alloy powders.

The overall volume concentration of pigments is 40 to 60%, preferably 45 to 55%.

When the concentration is less than 40%, the drying property is reduced.

When the concentration exceeds 60%, the impact property is deteriorated.

When the paint prepared according to the invention is used as a primary anti-corrosive paint for steel, the heat resistance is immensely improved compared to the modified inorganic zinc-rich primers, which are currently mainly used, while the workability is the same as with the prior art paint.

Consequently, the anti-corrosive property of the back surface of welding and removal of deformation is extremely improved to permit reduction of secondary rust removal.

Further, heretofore, when an oil-based paint is coated over a modified inorganic zinc-rich primer and is placed in a humid environment, peeling occurred.

The paint according to the invention exhibits satisfactory adherence even when it is kept in a humid environment.

Further, it has been made obvious that by eliminating the organic polymer and reducing the zinc dust concentration, the welding property and gas cutting property are reduced compared to the modified inorganic zinc-rich primer and a high level quality balance can be obtained for use as the primary anti-corrosive primer for steel.

Now, examples of carrying out the invention will be described in detail in conjunction with examples of preparation, examples and comparative examples.

Unless otherwise specified, parts and % are parts by weight and % by weight.

Reaction with Titanium oxide

The capability of reaction between titanium oxide and hydrolyzed condensate of tetraalkoxy silicate is verified by the following test.

Various pigments shown in Table 1 which are generally employed for paints, as well as titanium oxide, were suspended in an amount of 20% by volume in a hydrolyzed condensate of tetra-alkoxy silicate (i.e., tetraethoxy silicate here).

Each suspension thus obtained was coated using a spray and to a dry film thickness of 30 to 40 μm on a sand-blasted steel plate, which was then set at room temperature for 24 hours.

Thereafter, the various physical properties of the dry film, e.g., wear-proof property and rubbing after 48-day immersion in MEK, were measured.

The results of measurement are shown in Table 1.

TABLE 1

Physical properties of various pigments/ethyl silicate hydrolyzed condensate paint film

| Pigment | Wear-Prooftest | Rubbing test after 48-hour immersion in MEK | Paint film after heating at 800° C. for 15 minutes |
| --- | --- | --- | --- |
| Zinc dust | ◉ | ◉ | Oxidation occurred, there by cohesion is reduced |
| Iron phosphate | ○ | ○ | Breakdown of paint film |
| Zinc phosphate | X | X | Same as above |
| Aluminum Phosphate | X | X | Same as above |
| Mica | X | X | Same as above |
| Talc | X | X | Same as above |
| Baryta | X | X | Same as above |
| Chromium Oxide | ○ | Δ | Reduction of adhesion but paint film is intact |
| Iron Oxide | ○ | Δ | Same as above |
| Titanium Oxide | ◉ | ◎ | Paint film is intact, and no reduction in adhesion is recognized |
| Zinc Oxide | ○ | Δ | Paint film is intact, but the adhesion is reduced. |
| None (clear system) | X | X | Paint film is peeled. |

◎: Excellent, ○: normal, Δ: slightly poor, X: poor

Preparation of Vehicle Solution

EXAMPLE 1

40 parts of tetraethoxy silicate, 20 parts of isopropyl alcohol and 5 parts of isopropyl alcohol containing 5% of ferric chloride as shown in Table 2, were put into a reactor made of stainless steel.

Then, the content in the reactor was agitated while increasing its temperature to 30° C.

Then, 4.8 parts of an aqueous solution containing 0.3% of hydrochloric acid solution was dropped into the system in 30 minutes, and the content was heated to 50° C. and was then agitated at 50° C. for 2 hours.

Then, the system was diluted by adding 30.2 pars of isopropyl alcohol to obtain vehicle A with 26% of non-volatile matter.

EXAMPLES 2 AND 3

Materials for respective vehicles of example 2 and 3 B and C were mixed in the formulated ratio as shown in Table 2, and the mixtures were processed similar to Example 1 to obtain vehicles B and C.

With either vehicle, the non-volatile matter was 26%.

TABLE 2

| Manufacturing Examples Vehicle code | Vehicle A | Vehicle B | Vehicle C |
|---|---|---|---|
| Tetraethoxy silicate (Ethyl silicate 40: a Trade Mark, made by Nippon Colcoat Co., Ltd.) | 40.0 Parts | Parts | Parts |
| Tetraisopropoxy silicate (Reagent) | | 40.0 | |
| Tetrabutoxy silicate (Reagent) | | | 40.0 |
| Isopropyl alcohol | 20.0 | 20.0 | 20.0 |
| Ferric chloride solution (5 wt % solution of isopropyl alcohol) | 5.0 | 5.0 | 5.0 |
| 0.3 Wt % solution of hydrochloric acid | 4.8 | 4.8 | 4.8 |
| Isopropyl alcohol | 30.2 | 30.2 | 30.2 |
| total | 100.0 Parts | 100.0 Parts | 100.0 Parts |

TABLE 3

| | Formulation Example (wt %) | | | | | | | | | | | | Comparative Example (wt %) | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 | 4 | 5 |
| Vehicle | | | | | | | | | | | | | | | | | |
| Vehicle A | 41.1 | 30.1 | 31.2 | 30.8 | 30.6 | | | | | | | | 41.3 | 30.0 | 21.2 | 20.3 | 25.2 |
| Vehicle B | | | | | | 38.4 | 42.7 | 30.0 | 22.1 | | | | | | | | |
| Vehicle C | | | | | | | | | | 38.4 | 44.8 | 34.8 | | | | | |
| Polyvinyl butyral resin solution #1 | | | | | | | | | | | | | | | 5.9 | 2.4 | |
| Pigment | | | | | | | | | | | | | | | | | |
| Zinc dust (in sphere: Trade Mark produced by Sakai Industry Co., Ltd) | 28.6 | | 7.4 | 15.6 | | 20.4 | 9.8 | | 22.9 | | 11.2 | 15.2 | 34.6 | 27.9 | 26.1 | 42.1 | 34.7 |
| Zinc dust (in flake: Trade Mark; Zinc dust ZF, made by Sakai Industry Co., Ltd) | | 10.2 | | | 20.6 | | | 13.7 | | 20.9 | | | | | | | |
| Titanuim oxide (Rutyl type: Produced by Teikoku Chemical Industry Co., Ltd) | 7.8 | | | 11.1 | 14.3 | 10.9 | | 16.3 | | | 12.4 | 22.5 | | 3.3 | | | |
| Titanium oxide (Anataae, Traele Mark: Titanium JR-602) | | 17.2 | 22.4 | | | | 16.2 | | 6.8 | | | 12.7 | | | | | |
| Talc | | | 12.2 | | | 4.4 | | | | | 2.0 | | 5.0 | | | | 7.2 |
| Mica | 2.9 | | | | | | | | 3.2 | | 6.5 | | 2.4 | | | 8.1 | |
| Chromium Oxide | | 15.0 | | | | 4.5 | | | | | 2.0 | | 2.4 | | | 3.8 | |
| Iron Oxide | | | | | 7.1 | | | | 14.7 | | | 6.5 | | 5.0 | 18.0 | | 4.4 |
| Al—Zn alloy dust #2 | | | | | | | | 5.9 | | 3.5 | | | | | | | |
| Iron phosphate | | | | 15.3 | | | | | | | | | | | | | |
| Silica powder | | | | | | | 12.9 | 5.9 | | | | | | | | | 7.2 |
| Solvent | | | | | | | | | | | | | | | | | |
| Isopropyl alcohol | 19.6 | 27.5 | 26.8 | 27.2 | 27.4 | 21.4 | 18.4 | 28.2 | 33.5 | 21.6 | 17.5 | 24.3 | 19.3 | 22.9 | 32.3 | 25.7 | 21.3 |
| total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| ○ Pigment Volume % | 40 | 52 | 58 | 48 | 50 | 45 | 48 | 56 | 58 | 45 | 42 | 50 | 37 | 46 | 55 | 65 | 63 |
| ○ Volume % of Zinc Dust (Vol %) | 23.0 | 9.0 | 5.5 | 14.5 | 18.5 | 16.0 | 6.5 | 11.0 | 24.0 | 16.5 | 8.5 | 12.0 | 24.0 | 24.0 | 28.0 | 40.0 | 28.0 |
| ○ Vol % of titanium oxide | 11.0 | 25.0 | 29.0 | 18.0 | 22.5 | 15.0 | 19.0 | 23.0 | 12.5 | 17.0 | 28.0 | 17.5 | — | 5.0 | — | — | — |

1 20% isopropyl alcohol solution of Eslec BL-1 (Polyvinyl Butyral produced by Sekisui Chemical Co. Ltd.)
2 Heat proof aluminum alloy pigment 60 - 650 (Produced by Toyo aluminum Co. Ltd.)

EXAMPLES 1 TO 12, COMPARATIVE EXAMPLES 1 to 5

Pigments and solvents were added to mixtures containing vehicles in proportions as shown in Table 3, and the admixtures were sufficiently agitated with a dissolver to obtain respective anti-corrosive paint compositions.

These anti-corrosive paint compositions were tested in the following procedure to evaluate them with the following evaluation standards.

Test procedure and Evaluation Standards (I) Each anti-corrosive paint composition was coated by manual spraying on a polished soft steel plate, rinsed by xylol, to a dry film thickness of 20 μm, followed by setting in a room for 2 hours.

Then, the paint film was observed visually and was graded with the following standards.

○: the paint film, is uniform and sufficiently dry so that it is judged to be satisfactory Δ: the coating film, is partially non-uniform which gives practical failure and is judged to be unsatisfactory X: the coating film, is non-uniform and is judged to be practically unsatisfactory (II) Heat Resistance Test Each anti-corrosive paint composition was coated on a sandblasted steel plate (70×150×1.6 mm) by air spraying to a dry film thickness of 20 μm, followed by setting in a room for 48 hours, heating in an electric furnace at 800° C. for 20 minutes and then water cooled.

Then, the peeling of paint film was examined with cellophane tape, and the heat resistance was judged by the following evaluation standards with the peeling area being the measurement of the heat resistance.

○: the paint film with a peeling area of 0 to 10% was judged to be satisfactory

△: the paint film with a peeling area of 11 to 50% was judged to be practically unsatisfactory X: the paint film with a peeling area over 50% was judged to be practically unsatisfactory (III) Anit-corrosive property Test after Heat resistance Test The test plate obtained in the method of the test (II) (without peeling with cellophane tape) was subjected to a salt water spray test and an outdoor exposure test to evaluate the anti-corrosive property.

The evaluation standards are as follows.

○: the paint film with a rusted area of 0 to 3% was judged to be satisfactory

△: the paint film with a rusted area of 4 to 10% was judged to be practically unsatisfactory X: the paint film with a rusted area of 11% or above was judged to be practically unsatisfactory (IV) Compatibility Test to Topcoat Each anti-corrosive paint composition was coated on a sand-blasted ateel plate (70×150×1.6 mm) by an air spray to a dry film thickness of 15 to 20 μm.

The coated steel plate was set for 48 hours, followed by heating in an electric furnace at 800° C. for 20 minutes (the procedure being referred to as (a)) and then outdoor exposure for 7 days (the procedure being referred to as (b)).

After procedures (a) and (b), an oil based anti-corrosive paint was coated by an air spray to have dry film thickness of 30 μm.

The coated plate was then subjected to a 240-hour salt water spray test, and then to an adhesion test.

The evaluation was done by cross cut test (at a 2-mm interval) with cellophane tape.

The evaluation standards were as follows.

○: the paint film with the non peeled paint film of 100/100 to 90/100 was judged to be satisfactory △: the paint film with the non peeled film of 89/100 to 70/100 was judged to be practically satisfactory X: the paint film with the non peeled film of 71/100 or below was judged to be practically unsatisfactory (V) Gas Cutting Property Test Each anti-corrosive paint composition was coated on a sand-blasted steel plate (500×100×16 mm) with an air spray to have a dry film thickness of 20 μm, followed by setting for 48 hours.

Then, a cutting speed for WES Class 1 cutting surface was obtained using a "Type Gas Cutter" (a trade name by Tanaka Seisakusho Co., Ltd.) under conditions of an oxygen pressure of 3.5 kg/cm, an acetylene pressure of 0.5 kg/cm² and a nozzle of No. 2.

A cutting speed of 450 mm/min, or above is satisfactory.

Welding Test

Each anti-corrosive paint composition was coated on a sand-blasted 50-kg class high tension steel (500×100×16 mm, with end surfaces polished with grinder) with an air spray to a dry film thickness of 20 μm (end surfaces also being coated), followed by setting for 48 hours.

Then, fillet welding was done by the carbon acid gas welding (wire: KC 50, 1.2 mm in diameter, CO/Ar-6/4, current: 250 A), and the appearance of beads and blow pin holes were examined.

The evaluation standards were as follows.

○: the appearance of beads and blow pin holes are both satisfactory so that it is judged that there is no substantial problem △: the appearance of beads and blow pin holes are both unsatisfactory so that it is judged that they are practically unfit for use X: the appearance of beads and blow pin holes are defective so that it is judged that they are practically unsatisfactory The results of the above tests are shown in Table 4.

As it is obvious from the results of tests shown in Table 4, the Examples 1 to 12 according to the invention all show satisfactory results.

On the other hand, the Comparative Examples which are outside the scope of the invention show unsatisfactory results at least in one of the tests, and they are liable to present problems in actual use.

TABLE 4

| | Example | | | | | | | | | | | | Comparative Example | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 | 4 | 5 |
| (I) Appearance of the coated film | ○ | ○ | ○ | ○ | ○ | ○ | ○ | ○ | ○ | ○ | ○ | ○ | ○ | ○ | ○ | △ | △ |
| (II) Heat Resistance Test | ○ | ○ | ○ | ○ | ○ | ○ | ○ | ○ | ○ | ○ | ○ | ○ | △ | X | X | △ | △ |
| (III) Anti-corrosive after Heat Resistance Test Anti-corrosive Test | | | | | | | | | | | | | | | | | |
| Salt water spraying test | ○ | ○ | ○ | ○ | ○ | ○ | ○ | ○ | ○ | ○ | ○ | ○ | X | X | X | △ | △ |
| Outdoor exposure test | ○ | ○ | ○ | ○ | ○ | ○ | ○ | ○ | ○ | ○ | ○ | ○ | △ | X | X | △ | △ |
| (IV) Compatibility test to Topcoat | | | | | | | | | | | | | | | | | |
| (a) After Heat Resistance Test | ○ | ○ | ○ | ○ | ○ | ○ | ○ | ○ | ○ | ○ | ○ | ○ | X | X | X | X | X |
| (b) After Outdoor exposure Test | ○ | ○ | ○ | ○ | ○ | ○ | ○ | ○ | ○ | ○ | ○ | ○ | X | △ | △ | X | X |
| (V) Gas Cutting Property test Cutling velocity mm/min | 450 | 550 | 550 | 520 | 500 | 550 | 580 | 550 | 450 | 550 | 550 | 550 | 400 | 450 | 420 | 350 | 400 |
| (VI) Welding Property | ○ | ○ | ○ | ○ | ○ | ○ | ○ | ○ | ○ | ○ | ○ | ○ | X | △ | X | X | X |

TABLE 4-continued

| | Example | | | | | | | | | | | | Comparative Example | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 1 | 2 | 3 | 4 | 5 |
| test | | | | | | | | | | | | | | | | | |

What is claimed is:

1. An anti-corrosive paint composition, the film-forming components of which consist essentially of:
   (a) from 22.1 to 44.8 parts by weight of a vehicle which is a hydrolyzed condensate of tetraalkoxy silicate, the alkyl groups of which have from 1 to 5 carbon atoms,
   (b) from 7.4 to 28.6 parts by weight of zinc dust, and
   (c) from 6.8 to 22.5 parts by weight of titanium oxide.

2. An anti-corrosive paint as claimed in claim 1 in which said vehicle is prepared by hydrolysis and condensation using, as a catalyst, an inorganic acid selected from the group consisting of hydrochloric acid, nitric acid and sulfuric acid, or a mixture of said inorganic acid with formic acid or acetic acid.

3. An anti-corrosive paint as claimed in claim 1 in which the pigment volume concentration in the paint composition is from 40 to 60 vol.%, and, in the film obtained by drying said paint, the zinc dust concentration in said film is from 5 to 25 vol.% and the titanium oxide concentration in said film is 10 to 30 vol.%.

4. An anti-corrosive paint as claimed in claim 1 in which the pigment volume concentration in the paint composition is from 45 to 55 vol.%, and, in the film obtained by drying said paint, the zinc dust concentration in said film is from 8 to 20 vol.% and the titanium oxide concentration in said film is 15 to 25 vol.%.

5. An anti-corrosive paint as claimed in claim 1 in which the weight ratio of titanium oxide (c)/zinc dust (b) is from 7.8/28.6 to 22.4/7.4.

* * * * *